(12) United States Patent
Pao

(10) Patent No.: US 7,920,464 B2
(45) Date of Patent: Apr. 5, 2011

(54) METHOD OF REDUNDANCY OF RING NETWORK

(75) Inventor: Chih-Hsiung Pao, Taipei (TW)

(73) Assignee: Etherwan Systems, Inc., Sindian (TW)

( * ) Notice: Subject to any disclaimer, the term of this patent is extended or adjusted under 35 U.S.C. 154(b) by 127 days.

(21) Appl. No.: 12/394,335

(22) Filed: Feb. 27, 2009

(65) Prior Publication Data

US 2010/0091646 A1   Apr. 15, 2010

(30) Foreign Application Priority Data

Oct. 15, 2008   (TW) ................. 97139542 A

(51) Int. Cl.
*G01R 31/08* (2006.01)
*H04L 12/28* (2006.01)

(52) U.S. Cl. ...................................... 370/222; 370/258

(58) Field of Classification Search .............. 370/216, 370/217, 219, 220, 222, 223, 224, 226, 228, 370/400, 419, 420, 254, 255, 258
See application file for complete search history.

(56) References Cited

U.S. PATENT DOCUMENTS 7,440,397 B2 * 10/2008 Tsurumi et al. ............... 370/222
2009/0016214 A1 * 1/2009 Alluisi et al. ................. 370/228
* cited by examiner

*Primary Examiner* — Hanh Nguyen
(74) *Attorney, Agent, or Firm* — C. G. Mersereau; Nikolai & Mersereau, P.A.

(57) ABSTRACT

A ring network redundancy method is disclosed. If somewhere the connection of the ring network is damaged and broken, then the state of an initially blocked port that has been assigned as blocked is set as forward so as to keep the network functioning. And after the problem is repaired, a newly assigned blocked port is then assigned so that there is now once more a blocked ported; wherein the position of this newly assigned blocked port is set directly at one of the two ends of the repaired network line. Thereby the resettling time for the position of the newly assigned blocked port is reduced, thus the ring network system becomes much more stable.

14 Claims, 5 Drawing Sheets

METHOD OF REDUNDANCY OF RING NETWORK

BACKGROUND OF THE INVENTION

1. Field of the Invention

The present invention is related to a method of redundancy of a network, especially to a method of redundancy of a ring network with broadcast storm prevention mechanism.

2. Description of Related Art

With the rapid growth of the modern technology, various communication devices and computer networks make information spread much more rapidly. For companies, businesses, and even the common people, keeping the information flowing without obstruction is very important. Generally, communication networks can be defined briefly as the whole operation environment with communication devices connecting to one another. According to the scope of the region being covered, communication networks can be classified into three primary types, including local area networks (LAN), metropolitan area networks (MAN), and wide area networks (WAN). Among the three types of communication networks, the LAN is the networks with the smallest scope of region covered, usually used in the same office, building, or campus.

In the world of communication networks, every node in the networks must obey the same rule for the exchange of information to be established successfully. Therefore, communication protocols are formed with specific requirements and format. The most common communication protocols are the Open System Interconnection model (OSI model) set up by the International Organization for Standardization (ISO), and the series of IEEE 802 set up by the Institution of Electrical and Electronics Engineers (IEEE). Therein, Ethernet is used as one of the common schemes of LAN.

A network structure is not only about the topology of network connection, but also about the physical communication media and the access of information. OSI model acts as the reference concept for the network structure, as it doesn't address any specific implementation. However, the Ethernet, Token Ring network, Attached Resource Computer network (ARCnet), Fiber Distributed Data Interface (FDDI), and the AppleTalk, etc., are some of the communication protocols of network structure that may be attached to the OSI model.

Generally speaking, every node of the networks applied in the LAN and industrial automatic system has a network switch, which is used to connect related devices with the networks, these related devices may includes a computer, communication devices, and terminals, so as to facilitate information exchanging.

The topology of networks includes various kinds, such as line, ring, bus, star, mesh, and tree, etc., wherein the ring network connects the nodes of the network serially, additionally with the first node and the last node being connected to each other, thereby forming a close ring network. The nodes of the ring network can communicate to one another through the transmission lines of the ring network. However, if the information communicating on the ring network keeps looping without a stopping mechanism, the bandwidth of the ring network will be occupied, and thus new information will not be allowed to transmit; this problem is referred to as the broadcast storm. To overcome the problem, a blocked port is set in the ring network for stopping the information from passing through. Therefore, information will not be transmitted endlessly.

Moreover, because of the characteristic of communication within the ring network, when a node or a transmission line of the ring network is broken, the other nodes of the ring network will be influenced (since it is a circular closed loop) and cause the ring network to break down. Therefore, ensuring the communication flowing without obstruction is very important. The applying of redundancy scheme for improving the stability of the ring network is the algorithm of Rapid Spanning Tree protocol (RSTP). In RSTP, when a port that is being blocked so as to prevent endless loop of information (to be referred to as blocked port) detects any of the node or transmission line of the ring network failing, the blocked port changes its state into forward so as to keep the over-all network communicable, thereby fulfilling its purpose of redundancy. And after the failed node or transmission line is repaired, the state of the blocked port then recovers back to the initial status of being blocked.

However, due to the protocol convergence algorithm, the state changing of the blocked port is not fast enough in RSTP algorithm. Thus, the packets transmitted through the transmission line may be lost during the state changing, causing the system to fail due to needed information being lost.

SUMMARY OF THE INVENTION

The present invention introduces a redundancy method for a ring network, specifically for increasing the speed of redundancy implementation. And the method comprises a protection mechanism which stops the data from being transmitted in an endless loop, thus prevents broadcast storm.

For achieving objectives described above, the present invention provides a redundancy method of a ring network. The ring network has multiple switch nodes, and the nodes each has at least two ports, for connecting the switches serially and additionally with the first and last nodes connecting to each other thereby forming the ring network. The switch further stores the state of the ports.

The method introduced in the present invention comprising: determining initial states of ports in a ring network, setting one of the ports in the ring network as blocked port, the other ports as forward ports; when a line of the ring network has broken down, switches at two ends of the broken line broadcast a line broken signal; changing the state of the initially blocked port to forward when the line broken signal is received; setting the states of the ports at two ends of the broken line to blocked; and after the broken line is repaired, selecting one of the ports at two ends of the broken line to maintain its state as blocked, and the other port at two ends of the broken line change its state to forward.

Therein in the steps of selecting which port to be blocked, a comparison is made for the selection, and the comparing factor can be the magnitude of the MAC address of the ports, the recovering speed of the ports, etc.

The features of the present invention include: (1) when any transmission line is broken, the time of changing the initially blocked port to forward (<20 ms) is less than the RSTP algorithm (>1 sec); (2) after the broken line is repaired, the present invention directly sets one of the ports at two ends of the broken line to forward, whereas the RSTP algorithm needs to firstly broadcast the line repaired information and than sets the blocked position back at the initially blocked port. Because of the rapid growth of the modern technology, the number of nodes in a ring network thereby increases. By the elimination of the broadcasting of the line broken information or repair information, the state changing time of the method introduced in the present invention is shorter than the prior techniques, and the stability of the ring network system is thereby increased.

For further understanding of the present invention, reference is made to the following detailed description illustrating the embodiments and examples of the present invention. The description is only for illustrating the present invention, not for limiting the scope of the claim.

BRIEF DESCRIPTION OF THE DRAWINGS

The drawings included herein provide further understanding of the present invention. A brief introduction of the drawings is as follows.

DETAILED DESCRIPTION OF THE PREFERRED EMBODIMENTS

Figure 1:
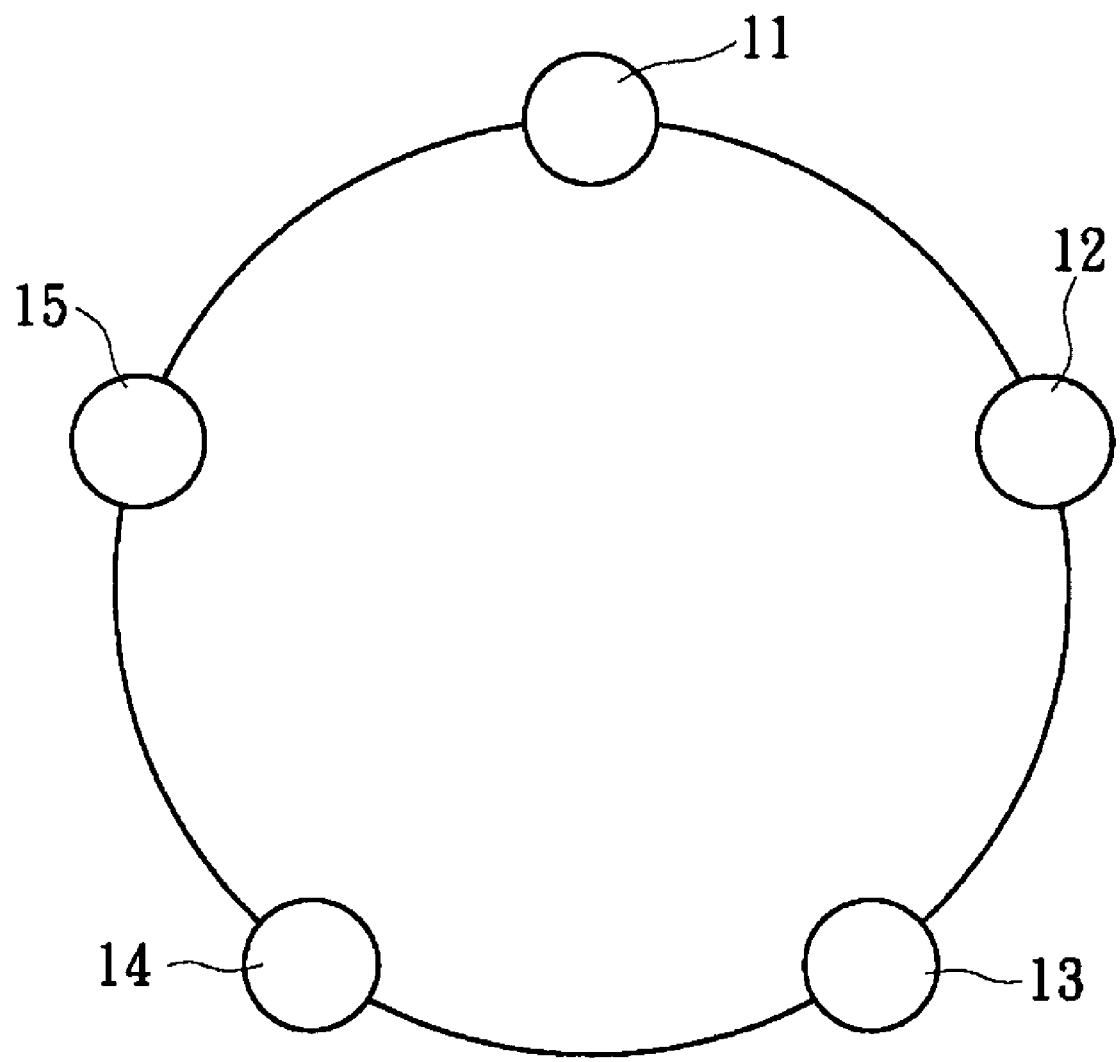
FIG. 1 is a structural diagram of a ring network of an embodiment according to the present invention.

Referring to FIG. 1, which represents the structure of a ring network of an embodiment according to the present invention, the embodiment comprises five switches 11-15 to construct the ring network, wherein each of the switches has two ports for ring network connection. The switch further stores the states of ports thereof. Of course, the number of nodes in the ring network is not limited to five.

Figure 2:
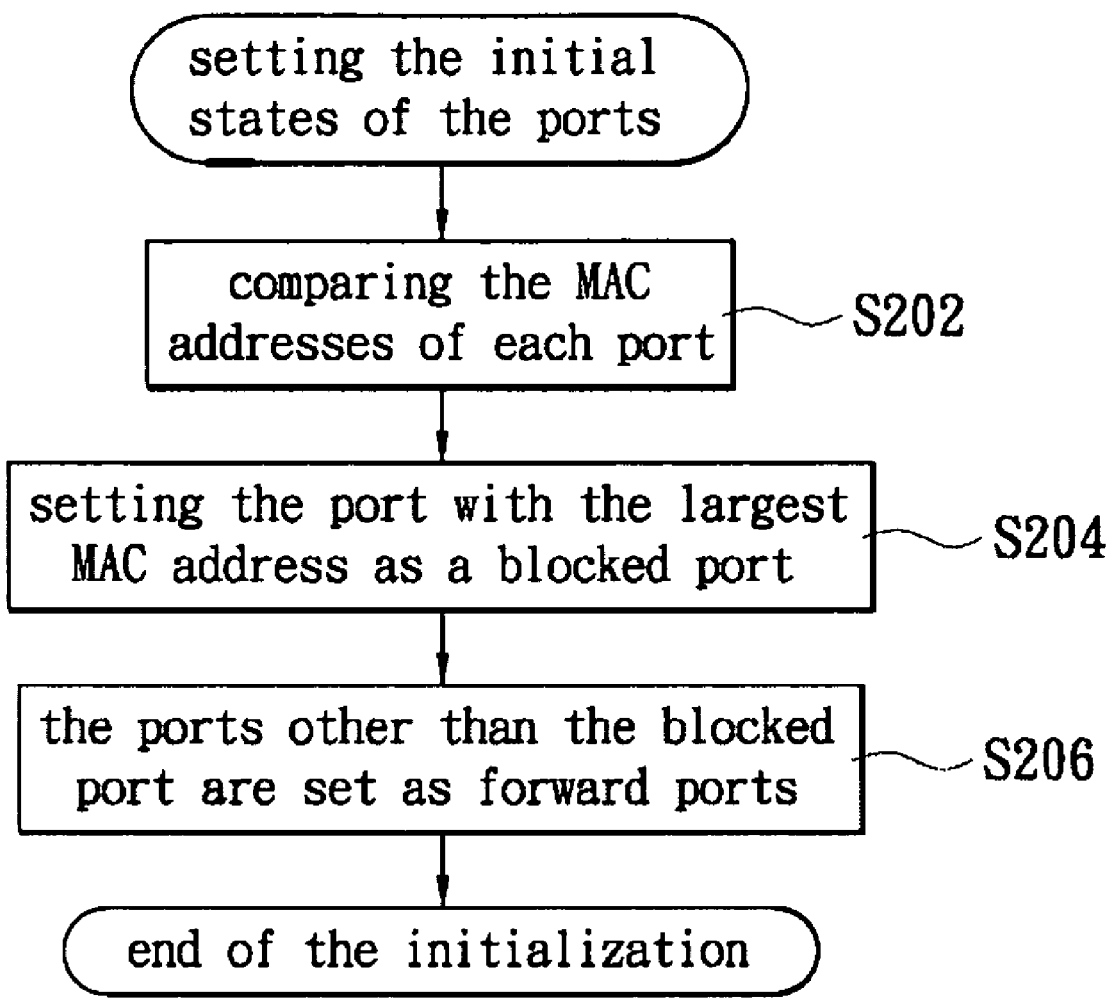
FIG. 2 is a flow chart of setting initial state of ports of an embodiment according to the present invention.

When the ring network is constructed, each node of the network will inform one another so as to set the initial state of the ports. As in FIG. 2, the determining method of initializing the states of ports of the embodiment comprises: comparing the MAC address of each port (S202); setting the port with the largest MAC address as a blocked port (S204); the ports other than the blocked one are set as forward ports (S206). However, the determining method of initializing the states of ports can be methods other than comparing the MAC addresses.

Figure 3:
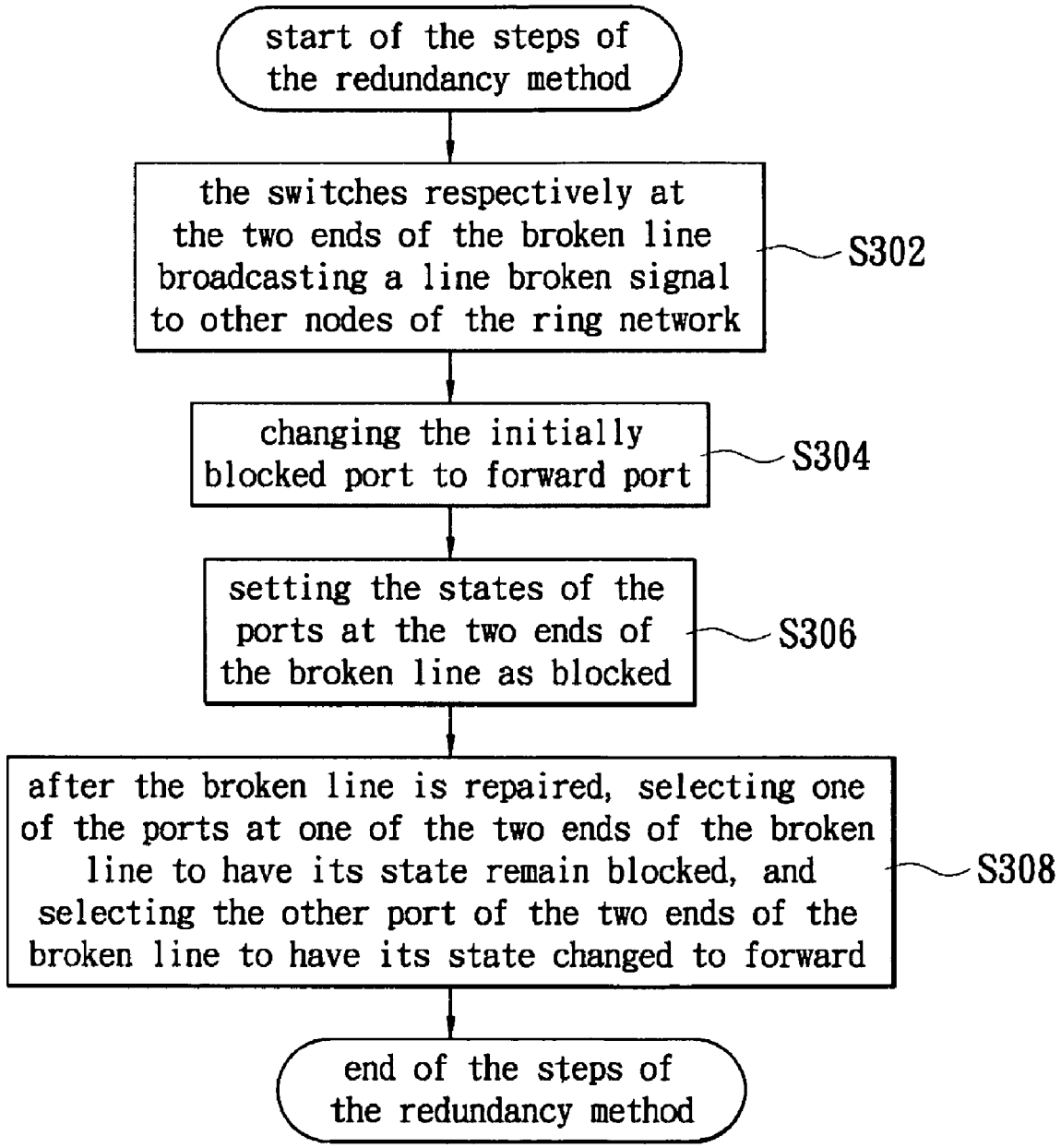
FIG. 3 is a flow chart of the redundancy method of an embodiment according to the present invention.
Figure 4:
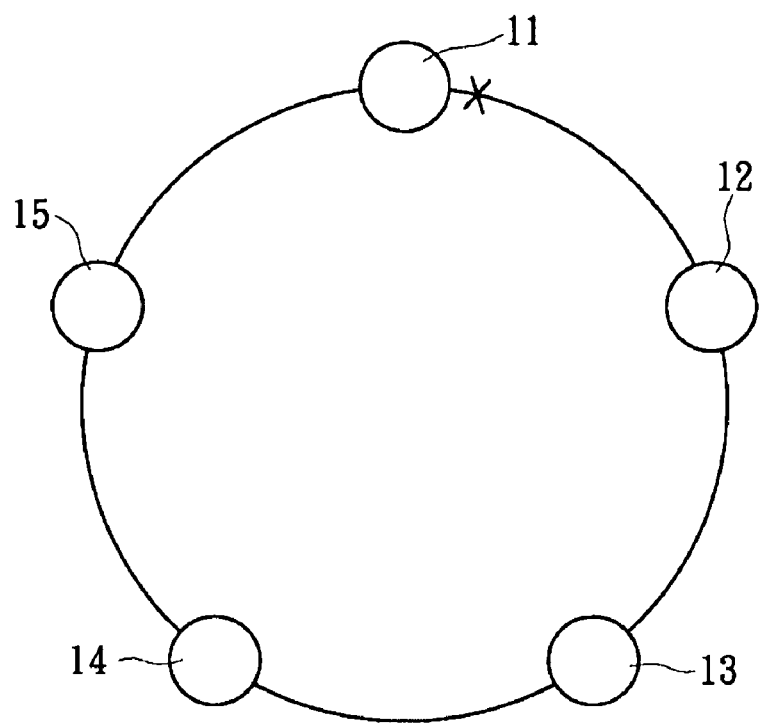
FIG. 4 to FIG. 7 are diagrams indicating the redundancy method of ring network of an embodiment according to the present invention.
Figure 5:
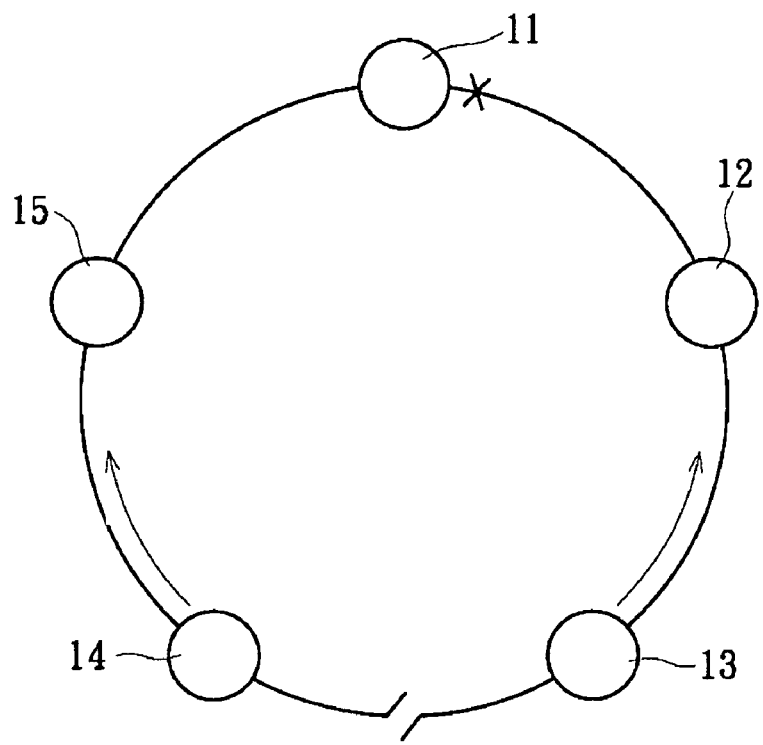

FIG. 3 is a flow chart of the redundancy method of an embodiment according to the present invention, corresponding to FIG. 4 to FIG. 7 for interpretation. As in FIG. 4, the "X" mark represents the initially blocked port in the ring network, and the blocked port is one of the ports on the switch 11. Than as in FIG. 5, if the transmission line between the switch 13 and switch 14 failed, the switch 13 and 14 will broadcast a line broken signal to inform all of the nodes in the ring network (S302), wherein the line broken signal can be any defined format of data.

Figure 6:
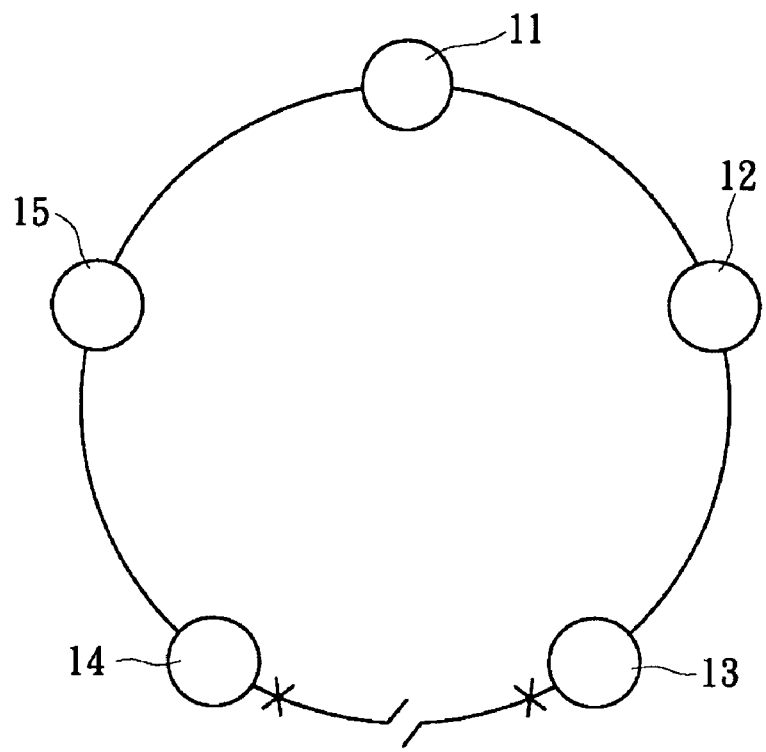

When the switch 11 receives the line broken signal, it changes the state of the initially blocked port to forward (S304); and the ports at two ends of the failed line are set as blocked port (S306), which is shown in FIG. 6. Therefore, the nodes in the ring network can still communicate to one another without the occurrence of broadcast storm.

Figure 7:
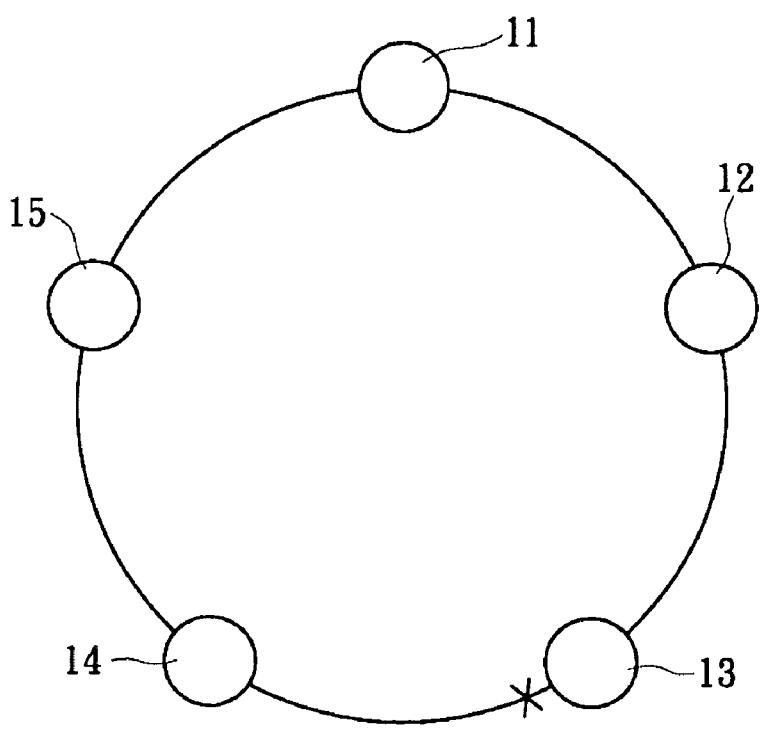

Next, as shown in FIG. 7, if the broken line is repaired, then selecting one of the ports at the two ends of the repaired line to maintain its state as blocked, and the other one change its state to forward (S308). Therein, the method of selection may comprise making a comparison between the recovering speeds of the two ports, making a comparison between the MAC addresses of the two ports, or any other defined method. For example, select the port with faster recovering speed to maintain its state as blocked, and the other port change its state to forward; or select the port with larger MAC address to maintain its state as blocked, and the other port change its state to forward.

The method of the present invention is that after the failed line is repaired, the blocked port is set directly at one of the two ports at the ends of the repaired line. By eliminating the need of broadcasting the repaired signal to the initially blocked port, the method of the present invention saves much more time than the prior techniques, and reduces the information loss due to the line failure, thereby further increasing the stability of the ring network system.

The description above only illustrates specific embodiments and examples of the present invention. The present invention should cover various modifications and variations made to the structures and operations described herein, and they still fall within the scope of the present invention as defined in the following appended claims.

What is claimed is:

1. A method of redundancy of a ring network, wherein the ring network has multiple switch nodes and each of the switch nodes comprises multiple ports, the method comprising:
    determining initial states of the ports in the ring network, and setting one of the ports in the ring network as a blocked port, the other ports as forward ports;
    when a line of the ring network has broken down, causing the switch nodes at two ends of the broken line to broadcast a line broken signal;
    setting the initially blocked port to the forward port when the initially blocked port receives the line broken signal;
    setting the ports at two ends of the broken line to the blocked ports; and
    after the broken line has been repaired, maintaining one of the ports at two ends of the previously broken line as the blocked port, and setting the other port at the two ends of the previously broken line to the forward port, based on a comparison between recovering rates of the ports at the two ends of the previously broken line.

2. The method as in claim 1, wherein the ports of the switch nodes of the ring network are for connecting the switch nodes serially with a first switch node and a last switch node being connected to each other for forming the ring network.

3. The method as in claim 1, wherein the switch node of the ring network further stores the state of the ports of the switch node.

4. The method as in claim 1, wherein determining the initial states of the ports in the ring network further comprises comparing MAC addresses of the ports.

5. The method as in claim 4, wherein comparing the MAC addresses of the ports is for locating the port with a maximum MAC address before it the step of maintaining the port with the maximum MAC address as the blocked port and setting the other ports on the ring network to the forward ports.

6. The method as in claim 1, wherein the comparison between the recovering rates of the two ports at the two ends of the broken line is for locating the port with a faster recovering rate before the step of maintaining the port with the faster recovering rate as the blocked port.

7. A method of redundancy of a ring network, wherein the ring network has multiple switch nodes and each of the switch nodes comprises multiple ports, the method comprising:
    determining initial states of ports in the ring network, and setting one of the ports in the ring network as a blocked port, and the other ports as forward ports;
    when a line of the ring network has broken down, causing the switch nodes at two ends of the broken line to broadcast a line broken signal;
    setting the initially blocked port to the forward port when the initially blocked port receives the line broken signal;
    setting the ports at two ends of the broken line as the blocked ports; and after the broken line has been repaired, maintaining one of the ports at two ends of the previously broken line as the blocked port, and setting the other port at the two ends of the previously broken line to the forward port, based on a comparison between MAC addresses of the ports at the two ends of the broken line;

wherein the comparison is for locating the port with the larger MAC address before the step of maintaining the port with the larger MAC address as the blocked port, and setting the other ports on the ring network as the forward ports.

8. The method as in claim 7, wherein the ports of the switch nodes of the ring network are for connecting the switch nodes serially with a first switch node and a last switch node being connected to each other for forming the ring network.

9. The method as in claim 7, wherein the switch node of the ring network further stores the state of the ports of the switch node.

10. The method as in claim 7, wherein determining the initial states of the ports in the ring network further comprising comparing the MAC addresses of the ports.

11. The method as in claim 10, wherein comparing the MAC addresses of the ports is for locating the port with a maximum MAC address before the step of maintaining the port with the maximum MAC address as the blocked port.

12. A method of redundancy of a ring network, wherein the ring network has multiple switch nodes and each of the switch nodes comprises multiple ports, comprising:

determining initial states of the ports in the ring network, setting one of the ports in the ring network as a blocked port, and setting the other ports as forward ports, wherein determining the initial states of the ports in the ring network further comprises comparing MAC addresses of the ports for locating the port with a maximum MAC address before setting the port with the maximum MAC address as the blocked port;

when a line of the ring network has broken down, causing the switch nodes at two ends of the broken line to broadcast a line broken signal;

setting the initially blocked port to the forward port when the initially blocked port receives the line broken signal;

setting the ports at the two ends of the broken line to the blocked ports; and after the broken line has been repaired, maintaining one of the ports at the two ends of the broken line as the blocked port, and setting the other port at the two ends of the broken line change to the forward ports.

13. The method as in claim 12, wherein the ports of the switch nodes of the ring network are for connecting the switches serially with a first switch node and a last switch node being connected to each other for forming the ring network.

14. The method as in claim 12, wherein the switch node of the ring network further stores the state of the ports of the switch node.

\* \* \* \* \*